US009531766B2

(12) United States Patent
Young et al.

(10) Patent No.: US 9,531,766 B2
(45) Date of Patent: *Dec. 27, 2016

(54) DYNAMIC VIRTUAL PRIVATE NETWORK

(71) Applicant: International Business Machines Corporation, Armonk, NY (US)

(72) Inventors: Charles K. Young, Powder Springs, GA (US); Terrence E. White, Raleigh, NC (US); Melanie R. Diggs, Mableton, GA (US); Gerald D. Colar, Mableton, GA (US)

(73) Assignee: International Business Machines Corporation, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 13/768,489

(22) Filed: Feb. 15, 2013

(65) Prior Publication Data
US 2014/0101325 A1    Apr. 10, 2014

Related U.S. Application Data

(63) Continuation of application No. 13/648,582, filed on Oct. 10, 2012.

(51) Int. Cl.
*G06F 15/16* (2006.01)
*H04L 29/06* (2006.01)
(Continued)

(52) U.S. Cl.
CPC ......... *H04L 65/1069* (2013.01); *H04L 12/465* (2013.01); *H04L 12/4633* (2013.01);
(Continued)

(58) Field of Classification Search
CPC ............. H04L 12/4641; H04L 12/4633; H04L 12/4675; H04L 12/465; H04L 12/4658; H04L 12/4662; H04L 12/4679; H04L 12/4683; H04L 12/4687; H04L 12/4691; H04L 12/4695; H04L 45/50
See application file for complete search history.

(56) References Cited

U.S. PATENT DOCUMENTS 3,973,834 A   8/1976   Penn et al.
4,172,443 A   10/1979  Sommer
(Continued)

OTHER PUBLICATIONS

Nelson Publishing, "Company Reaps the Benefits of SSL VPN: Employees, Suppliers and Business Partners All Gain from Secure Communications," INSPEC AN-9300211, Communications News, vol. 44, No. 1, pp. 40-41, Jan. 2007.
(Continued)

*Primary Examiner* — Ario Etienne
*Assistant Examiner* — Blake Rubin
(74) *Attorney, Agent, or Firm* — Fleit Gibbons Gutman Bongini Bianco PL; Thomas S. Grzesik

(57) ABSTRACT

Various embodiments establish a virtual private network (VPN) between a remote network and a private network. In one embodiment, a first system in the remote network establishes a connection with a central system through a public network. The central system is situated between the first system and a second system in the private network. The first system receives, from the central system and based on establishing the connection, a set of VPN information associated with at least the second system. The first system disconnects from the central system and establishes a VPN directly with the second system through the public network based on the set of VPN information.

21 Claims, 11 Drawing Sheets

(51) Int. Cl.
*H04L 12/46* (2006.01)
*H04L 12/723* (2013.01)

(52) U.S. Cl.
CPC ...... *H04L 12/4641* (2013.01); *H04L 12/4658* (2013.01); *H04L 12/4662* (2013.01); *H04L 12/4675* (2013.01); *H04L 12/4679* (2013.01); *H04L 12/4683* (2013.01); *H04L 12/4687* (2013.01); *H04L 12/4691* (2013.01); *H04L 12/4695* (2013.01); *H04L 45/50* (2013.01); *H04L 63/0272* (2013.01)

(56) References Cited

U.S. PATENT DOCUMENTS

| | | | |
|---|---|---|---|
| 6,449,272 B1* | 9/2002 | Chuah et al. | 370/389 |
| 6,751,729 B1* | 6/2004 | Giniger et al. | 713/153 |
| 7,036,143 B1* | 4/2006 | Leung et al. | 726/15 |
| 7,421,736 B2 | 9/2008 | Mukherjee et al. | |
| 7,444,415 B1* | 10/2008 | Bazzinotti et al. | 709/229 |
| 7,486,659 B1* | 2/2009 | Unbehagen et al. | 370/351 |
| 7,590,074 B1 | 9/2009 | Dondeti et al. | |
| 7,832,006 B2* | 11/2010 | Chen | H04L 63/20 726/22 |
| 7,954,145 B2 | 5/2011 | Mohanty et al. | |
| 8,260,922 B1* | 9/2012 | Aggarwal | H04L 45/24 709/226 |
| 8,549,281 B2* | 10/2013 | Samovskiy et al. | 713/151 |
| 8,966,260 B1 | 2/2015 | Walter et al. | |
| 2002/0006132 A1* | 1/2002 | Chuah et al. | 370/401 |
| 2002/0069278 A1* | 6/2002 | Forslow | H04L 63/0227 709/225 |
| 2002/0178361 A1* | 11/2002 | Genty | G06Q 20/0855 713/175 |
| 2002/0184388 A1* | 12/2002 | Yaseen et al. | 709/242 |
| 2002/0199007 A1* | 12/2002 | Clayton et al. | 709/230 |
| 2003/0041136 A1 | 2/2003 | Cheline et al. | |
| 2003/0079041 A1 | 4/2003 | Parrella, Sr. et al. | |
| 2003/0149787 A1 | 8/2003 | Mangan | |
| 2003/0177221 A1* | 9/2003 | Ould-Brahim et al. | 709/223 |
| 2003/0223406 A1* | 12/2003 | Balay et al. | 370/352 |
| 2004/0022258 A1* | 2/2004 | Tsukada et al. | 370/401 |
| 2004/0037296 A1* | 2/2004 | Kim et al. | 370/395.53 |
| 2004/0174887 A1* | 9/2004 | Lee | H04L 12/462 370/395.53 |
| 2004/0218538 A1 | 11/2004 | Wiedeman et al. | |
| 2004/0218611 A1* | 11/2004 | Kim | 370/401 |
| 2005/0047329 A1 | 3/2005 | Almog et al. | |
| 2005/0081045 A1* | 4/2005 | Nicodemus et al. | 713/182 |
| 2005/0132229 A1* | 6/2005 | Zhang et al. | 713/201 |
| 2005/0193103 A1* | 9/2005 | Drabik | 709/221 |
| 2006/0070115 A1* | 3/2006 | Yamada et al. | 726/3 |
| 2006/0193330 A1* | 8/2006 | Ishihara | H04L 12/4675 370/395.53 |
| 2007/0113275 A1* | 5/2007 | Khanna et al. | 726/15 |
| 2007/0136805 A1* | 6/2007 | Perry | G06Q 10/06 726/14 |
| 2007/0234418 A1 | 10/2007 | Song et al. | |
| 2008/0072312 A1* | 3/2008 | Takeyoshi et al. | 726/15 |
| 2008/0075088 A1* | 3/2008 | Carrasco | H04L 12/4641 370/395.5 |
| 2008/0181219 A1* | 7/2008 | Chen et al. | 370/389 |
| 2008/0201486 A1* | 8/2008 | Hsu | H04L 29/06 709/238 |
| 2009/0059837 A1* | 3/2009 | Kurk et al. | 370/315 |
| 2009/0122990 A1* | 5/2009 | Gundavelli et al. | 380/278 |
| 2010/0043068 A1* | 2/2010 | Varadhan et al. | 726/15 |
| 2011/0131647 A1 | 6/2011 | Sanders et al. | |
| 2011/0276669 A1 | 11/2011 | Wei et al. | |
| 2012/0124660 A1* | 5/2012 | Wang | 726/12 |
| 2012/0233674 A1* | 9/2012 | Gladstone et al. | 726/6 |
| 2013/0086236 A1* | 4/2013 | Baucke et al. | 709/223 |
| 2013/0182712 A1* | 7/2013 | Aguayo | H04L 12/4633 370/395.53 |
| 2013/0298182 A1* | 11/2013 | May | H04L 63/0272 726/1 |
| 2013/0305344 A1* | 11/2013 | Alicherry | H04L 63/0272 726/12 |
| 2014/0040435 A1* | 2/2014 | Ylimartimo | 709/219 |
| 2014/0068750 A1* | 3/2014 | Tjahjono et al. | 726/15 |
| 2014/0223507 A1* | 8/2014 | Xu | H04L 63/0272 726/1 |

OTHER PUBLICATIONS

Callon, R., et al., A Framework for Layer 3 Provider-Provisioned Virtual Private Networks (PPVPNs)(RFC4110), IPCOM000126388D, Jul. 1, 2005, copyright The Internet Society (2005).

Fang, L., et al., "Security Framework for MPLS and GMPLS Networks (RFC5920)," IPCOM000197430D, Jul. 1, 2010, copyright 2010 IETF Trust.

PTONY83, "Social VPN", http://socialvpn.word.press.com/, Apr. 26, 2008.

Mail@tobiasvolk.de, "PeerVPN—The Open Source peer-to-peer VPN," Oct. 9, 2012.

Non-Final Rejection dated Mar. 17, 2015 received for U.S. Appl. No. 13/648,582.

Final Office Action dated Jul. 29, 2015, received for U.S. Appl. No. 13/648,582.

Non-Final Office Action dated Feb. 26, 2016 received for U.S. Appl. No. 13/648,582.

* cited by examiner

DYNAMIC VIRTUAL PRIVATE NETWORK

CROSS-REFERENCE TO RELATED APPLICATIONS

This application is continuation of and claims priority from U.S. patent application Ser. No. 13/648,582 filed on Oct. 10, 2012, the disclosure of which is hereby incorporated by reference in its entirety.

BACKGROUND

The present invention generally relates to virtual private networks, and more particularly relates to dynamic site-to-site virtual private networks.

A virtual private network (VPN) is an extension of a private intranet network across a public network (e.g., the Internet) that creates a secure private connection between a remote network or client and the private intranet. A VPN securely conveys information across the public network connecting remote users, branch offices, and business partners into an extended corporate network. This effect is achieved through a secure encryption tunnel, which allows a private network to send data via a public network's connections. The secure encryption tunnel encapsulates a network protocol within packets carried by the public network. The data sent between two locations via the secure encryption tunnel cannot be read by anyone else.

BRIEF SUMMARY

In one embodiment, an information processing system in a remote network for establishing a virtual private network (VPN) between the remote network and a private network is disclosed. The information processing system comprises a memory and a processor that is communicatively coupled to the memory. A VPN device is communicatively coupled to the memory and the processor. The VPN device is configured to perform a method. The method comprises establishing a connection with a central system through a public network. The central system is situated between the information processing system and a second system in the private network. The first system receives, from the central system and based on establishing the connection, a set of VPN information associated with at least the second system. The first system disconnects from the central system and establishes a VPN directly with the second system through the public network based on the set of VPN information.

In another embodiment, a computer program storage product for establishing a virtual private network (VPN) between a first system in a remote network and a second system in a private network is disclosed. The computer program storage product comprises instructions configured to perform a method. The method comprises establishing a connection with a central system through a public network. The central system is situated between the information processing system and a second system in the private network. The first system receives, from the central system and based on establishing the connection, a set of VPN information associated with at least the second system. The first system disconnects from the central system and establishes a VPN directly with the second system through the public network based on the set of VPN information.

In yet another embodiment, an information processing system in a private network for establishing a virtual private network (VPN) between the private network and a remote network is disclosed. The information processing system comprises a memory and a processor that is communicatively coupled to the memory. A VPN device is communicatively coupled to the memory and the processor. The VPN device is configured to perform a method. The method comprises establishing a connection with a central system through a public network. The central system is situated between the information processing system system and a second system in the remote network. A first set of VPN information associated with at least the second system is received from the central system and based on establishing the connection. The first system disconnects from the central system based on the receiving. A request is received directly from the first system to establish a direct VPN, wherein the request comprises a second set of VPN information. The second set of VPN information is compared with the first set of VPN information. A VPN is established directly with the second system through the public network based on the first and second sets set of VPN information matching.

In a further embodiment, an information processing system situated between a first system in a remote network and a second system in a private network for establishing a virtual private network (VPN) between the remote network and the private network is disclosed. The information processing system comprises a memory and a processor that is communicatively coupled to the memory. A VPN device is communicatively coupled to the memory and the processor. The VPN device is configured to perform a method. The method comprises receiving, from the first system, a request to establish a VPN with the second system. A first set of VPN information associated with the second system is identified based on the request. The first set of VPN information is sent to the second system. The set of VPN information configures the second system to establish the VPN directly with the first system.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
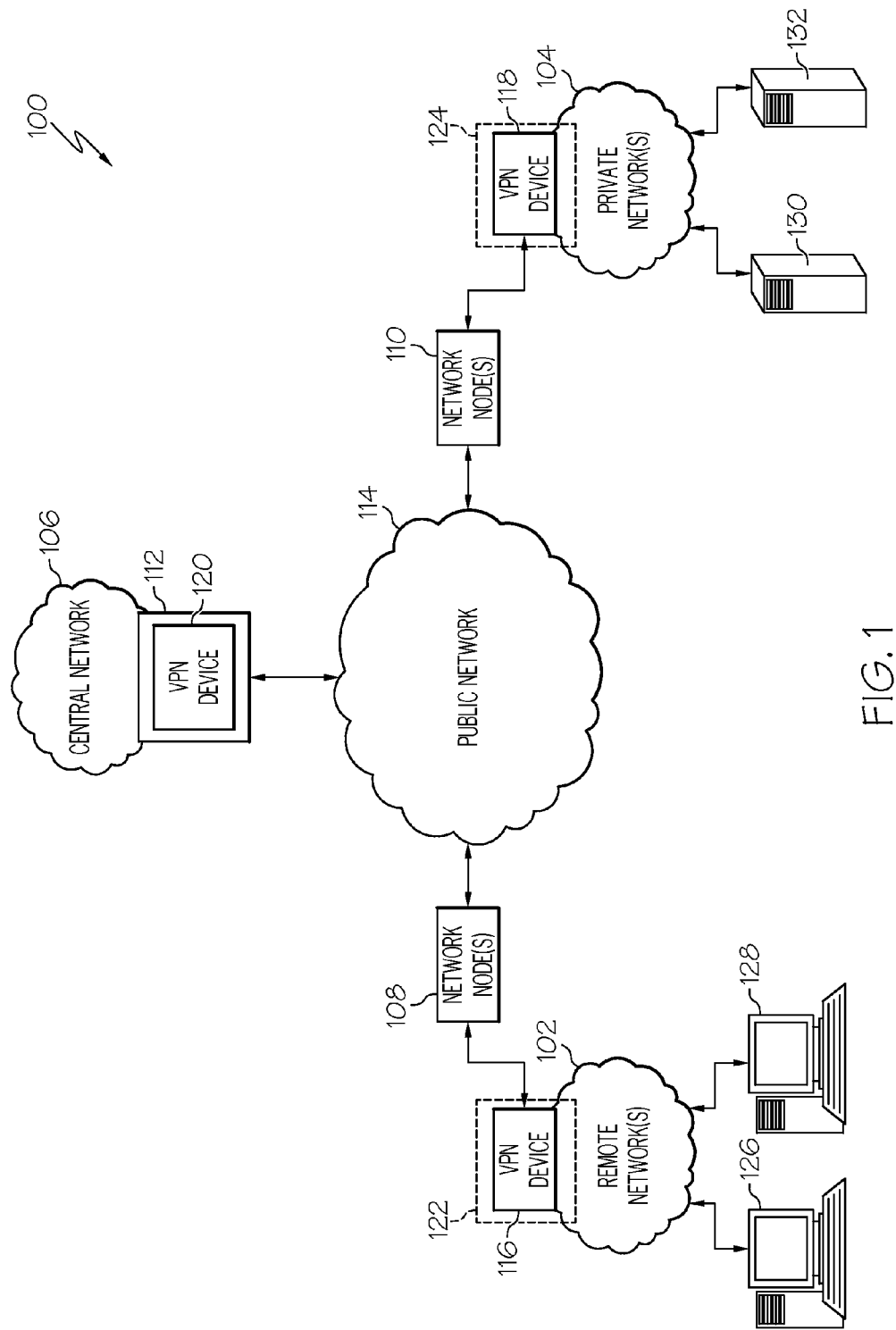
FIG. 1 is a block diagram illustrating one example of an operating environment according to one embodiment of the present invention.

FIG. 1 shows an operating environment 100 according to one embodiment of the present invention. The operating environment 100 comprises one or more remote networks 102, one or more private networks 104, and a central network 106. The central network 106 is situated between the remote network(s) 102 and the private network(s) 104. Each of these networks 102, 104, 106 is communicatively coupled to one or more networking nodes/systems 108, 110, 112 such as (but not limited to) a router, hub, gateway, etc. The networking nodes 108, 110, 112 communicatively couple their respective network 102, 104, 106 to a public network 114 such as the Internet.

In one embodiment, each of the networks 102, 104, 106 is communicatively coupled to one or more VPN devices 116, 118, 120. As will be discussed in greater detail below, the VPN devices 116, 118, 120 are used to establish VPNs between the various networks 102, 104 106. The VPN devices 116, 118, 120 can be implemented as hardware, software, or a combination thereof. For example, in one embodiment, a VPN device 116, 118, 120 is implemented as a separate device situated between a networking node 108, 110, 112 and its respective network 102, 104, 106. In another embodiment, a VPN device 116, 118, 120 resides within an optional server 122, 124 situated between user/client systems 126, 128, 130, 132 of the network 102, 104 and its respective networking node 108, 110. In a further embodiment, a VPN device 116, 118, 120 resides within a networking node 108, 110, 112. In the above embodiments, the VPN devices 116, 118, 120 connect the user/client systems 126, 128, 130, 132 to the private and central networks 104, 106 via one or more VPN connections. However, in another embodiment, a VPN device 116, 118, 120 resides within one or more of the user/client systems 126, 128, 130, 132, and the user/client systems establish the VPN connections.

The VPN devices 116, 118, 120 enable users at the remote network 102, via one or more of the user systems 126, 128, to access data stored on one or more of the systems 130, 132 in the private network 104. For example, users at the remote network 102 access the data at the private network 104 through a VPN established between the remote network 102 and the private network 104 via the VPN devices 116, 118, 120. The VPN connections includes a secure network tunnel between the remote network 102 and the private network 104, which is established on top of the underlying public network 114. Data traveling over the tunnel is not visible to and is encapsulated from traffic of the public network 114. The traffic within the tunnel appears to the public network 114 as just another traffic stream to be passed. In addition, the data packets that carry the payload between the two networks 102, 104 are encapsulated within the packets of the Internet protocol (IP), with additional packet identification and security information.

Dynamic Virtual Private Networks

In many conventional VPN environments, such as conventional site-to-site VPN environments, the VPN devices residing at remote and private networks do not maintain the necessary information to establish a VPN connection directly with each other. Therefore, a VPN device at a remote network is required to establish a VPN connection with a VPN device at the central network, which maintains all the necessary VPN information for establishing a VPN connection with the private network. Once the remote VPN device establishes a VPN connection with the central VPN device, the central VPN device establishes a VPN connection with the private VPN device. Therefore, a VPN tunnel between the remote network and the private network passes through the central network. This configuration can result in various resource issues such as bandwidth constraints and also adds an additional point of failure in the network.

Therefore, one or more embodiments of the present invention provide a dynamic VPN environment in which a remote network 102 establishes a VPN directly with a private network 104. It should be noted that the following discussion illustrates one example where the VPN devices 116, 118 at the remote and private networks 102, 104 are situated within a server system 122, 124 or networking node 108, 110. However, the following discussion also applies to embodiments where the VPN devices 116, 118 reside at the user/client systems 126, 128, 130, 132 as well.

Figure 6:
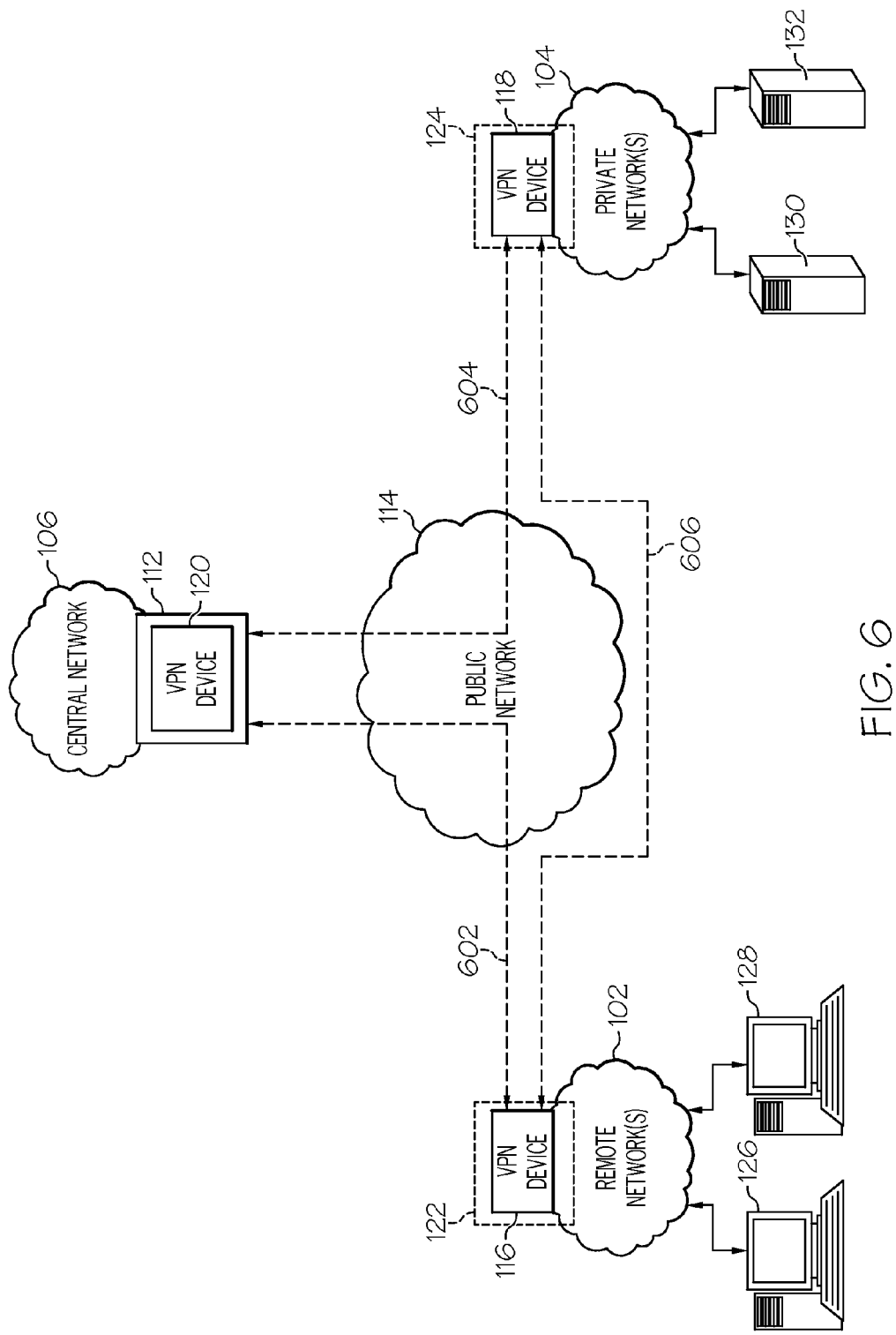
FIG. 6 is a block diagram illustrating an initial VPN connection between a remote network and a private network being provided through a central network, and a subsequent VPN connection established directly between the remote network and the private network according to one embodiment of the present invention.

In one embodiment, the remote VPN device 116 receives a request from a user for establishing a VPN connection with the private network 104. The remote VPN device 116 analyzes/searches its VPN information 202 (FIG. 2) to determine if VPN information associated with the private network 104 has been stored. In the current example, this is the first request (or at least the first request received within a given threshold) that has been received for establishing a VPN connection with the private network 104, and the remote VPN device 116 determines that VPN information for the private network 104 has not been locally stored. Therefore, the remote VPN device 116 utilizes a default VPN configuration to establish a VPN connection 602 (FIG. 6) with the central VPN device 120 at the central network 106, and requests a VPN connection be established with the private network 104, as shown in FIG. 6. The central VPN device 120 determines that the central VPN device 120 wants to connect to the private network based on information within the request (e.g., server name, IP address, port number, etc.).

Figure 2:
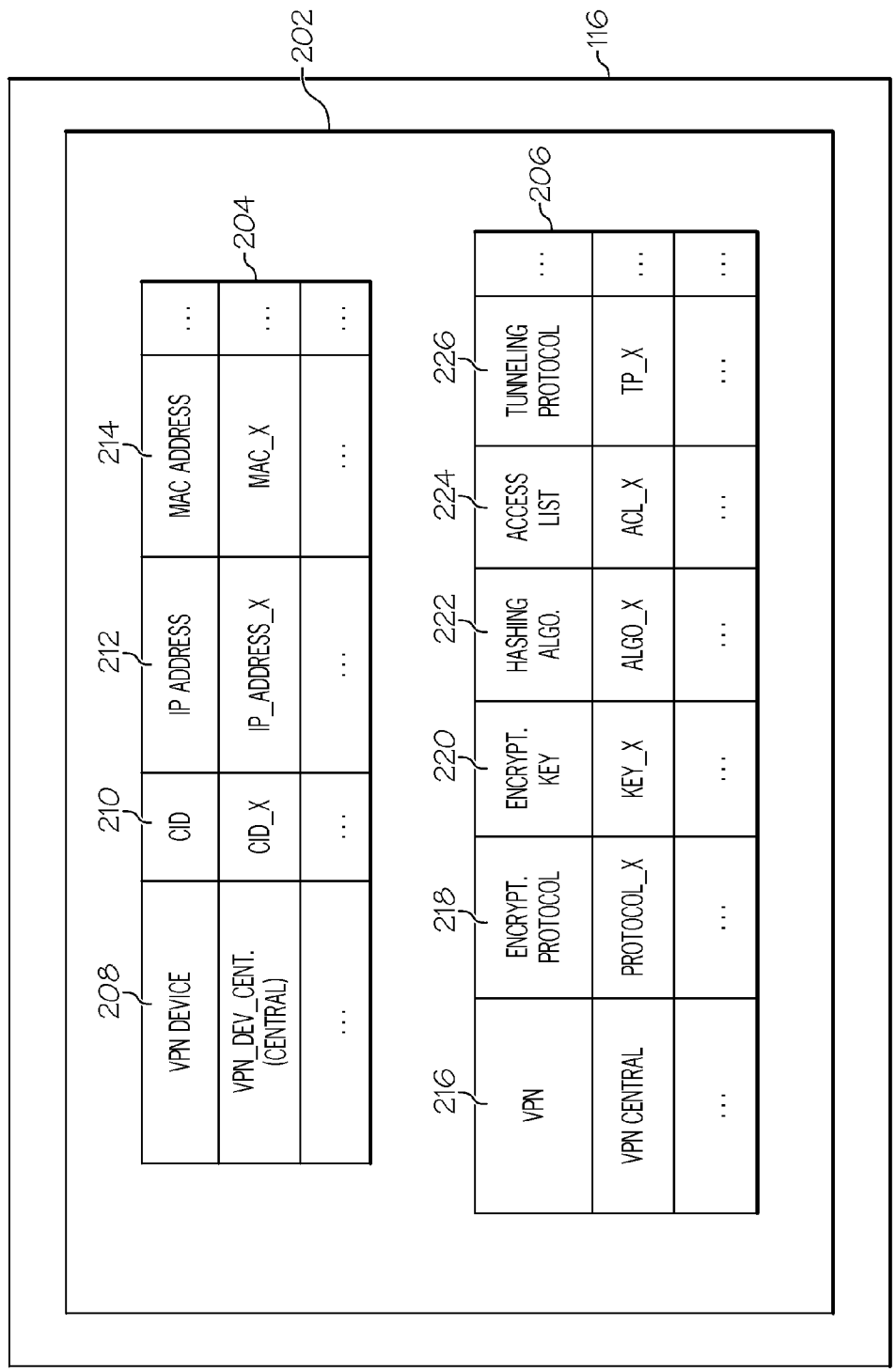
FIG. 2 illustrates one example of default VPN information maintained by a remote system in a remote network according to one embodiment of the present invention.

FIG. 2 shows one example of the default VPN configuration maintained within the VPN information 220 of the remote VPN device 116. Initially, the VPN address information 204 includes default information such as (but not limited to) a VPN Device name 208, a unique ID (client identifier "CID") 210, an Internet Protocol (IP) address 212, a Media Access Control (MAC) address 214, etc. associated with the central VPN device 120. The VPN tunneling information 206 initially includes default information such as (but not limited to) a default VPN identifier 216 associated with the central VPN device 120, an encryption protocol 218, an encryption key 220, a hashing algorithm 222, an access list 224, a tunneling protocol 226, etc. that are required to establish a VPN tunnel with the central VPN device 120. Other information such as (but not limited to) a transform set, Internet Security Association and Key Management Protocol (ISAKMP) parameters, and/or Internet Protocol Security (IPsec) parameters can also be included as well. It should be noted that the private VPN device 118 comprises a set of VPN information similar to VPN information 202 discussed above for establishing a VPN tunnel with the central VPN device 120.

Figure 3:
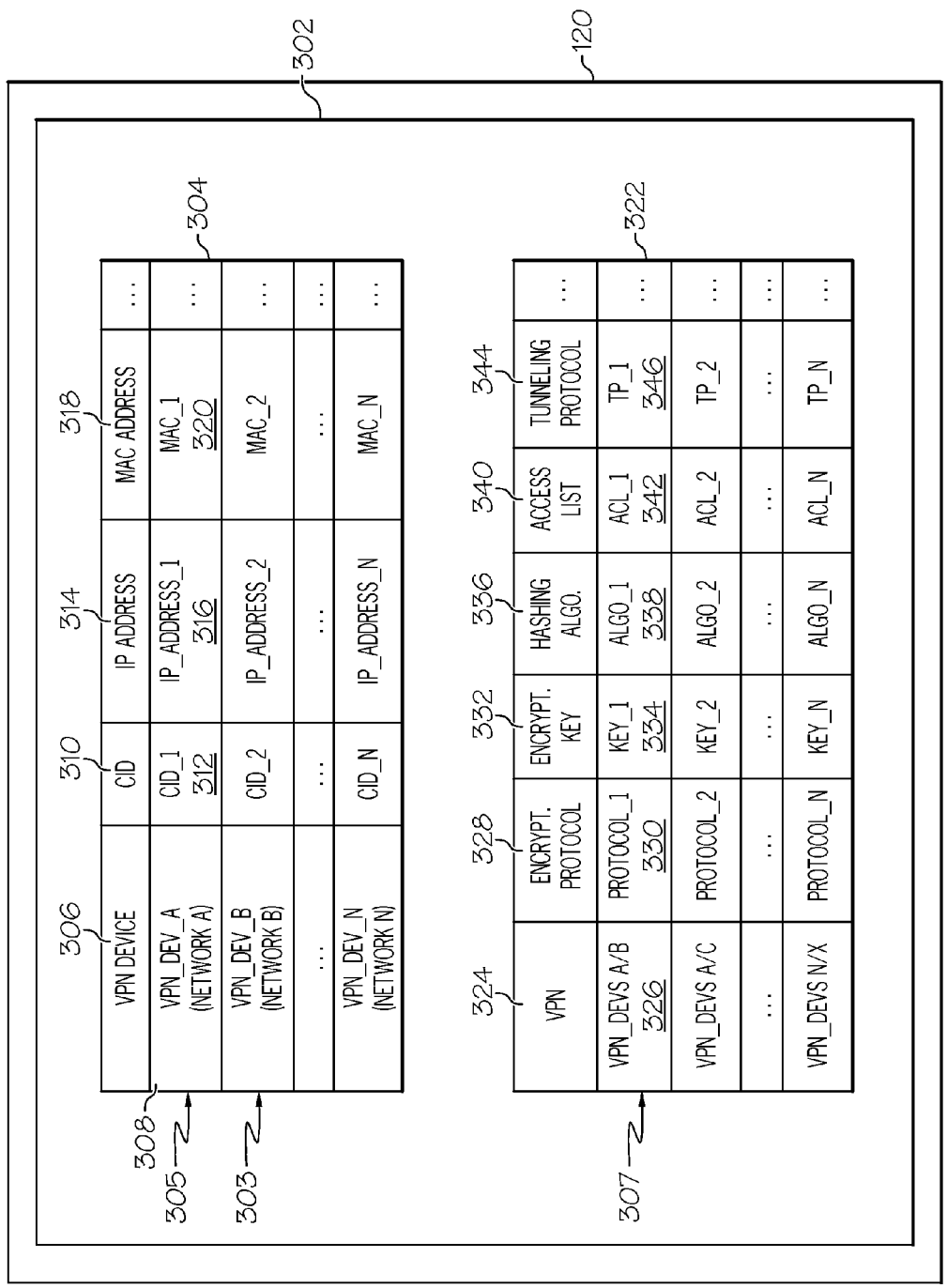
FIG. 3 illustrates one example of VPN information maintained by a central system in a central network according to one embodiment of the present invention.

After the central VPN device 120 receives the request from the remote VPN device 116 the central VPN device 120 analyzes/searches its VPN information 302 (FIG. 3) to identify the VPN information associated with the private network 104. FIG. 3 shows one example of the VPN information 302 maintained by the central VPN device 120. The VPN information 302 comprises the address information 304 of the network VPN devices 116, 118 associated with the central VPN device 120. For example, a first column 306 entitled "VPN Device" in the address information 302 comprises entries 308 that identify a given VPN device 116, 118 and/or network 102, 104 associated with a given VPN device 116, 118.

A second column 310 entitled "CID" comprises entries 312 that include the client identifier of the associated VPN device 116, 118. The CID can be automatically generated by the central VPN device 120 based on VPN parameters associated with the VPN device 116, 118 for a given VPN. For example, a CID associated with the remote VPN device 116 can be generated by the central VPN device 120 for a VPN connection with the private VPN device 118 (and hence the private network 102) based on a hashing type, an encryption technique, a tunneling protocol, a key distribution type, a transform set, ISAKMP parameters, and/or IPsec parameters that are associated with the VPN between the remote network 102 and the private network 104. In one embodiment, the generated CID is tied to an access list for this VPN. If a request to establish the VPN does not include this CID the request is denied.

A third column 314 entitled "IP Address" comprises entries 316 that include the IP address associated with the VPN device identified in the first column 306. A fourth column 318 entitled "MAC Address" comprises entries 320 that include the MAC address associated with the VPN device identified in the first column 306. The IP Address and MAC address information is used by the central VPN device 120 to identify and locate the VPN devices 116, 118 for establishing a VPN connection therewith. In one embodiment, the central VPN device 120 utilizes the CID as a pointer to identify the IP Address and MAC address information associated with the respective VPN device 116, 118.

The VPN information 302 maintained by the central VPN device 120 also includes the VPN tunneling information 322 required to establish a VPN between each of the VPN devices 116, 118 (and hence their networks 102, 104) coupled to the central VPN device 120. For example, a first column 324 entitled "VPN" in the VPN tunneling information 420 comprises entries 326 that identify a given VPN between two or more VPN devices such as the remote VPN device 116 and the private VPN device 118. A second column 328 entitled "Encrypt. Protocol" comprises entries 330 that identify the encryption protocol to be used for the associated VPN. A third column 332 entitled "Encrypt. Key" comprises entries 334 that identify the encryption to be used for the associated VPN. A fourth column 336 entitled "Hashing Algo." comprises entries 338 that identify the hashing algorithm to be used for the associated VPN. A fifth column 340 entitled "Access List" comprises entries 342 that include the access list(s) to be used for the associated VPN. A sixth column 344 entitled "Tunneling Protocol" comprises entries 346 identifying the tunneling protocol to be used for VPN identified in the first column 324.

The central VPN device 120, based on the request received from the remote VPN device 116, analyzes its VPN information 302 to identify the VPN information associated with the remote and private network devices 116, 118. The central VPN device 120 sends the identified VPN information to each of the remote VPN device 116 and the private VPN device 118. For example, the central VPN device 120 sends the address information 303 and VPN tunneling information 307 associated with the private VPN device 118 to the remote VPN device 116. In one embodiment, the central VPN device 118 sends the VPN and tunneling information 303, 307 to the remote VPN device 116 via the secure VPN connection 602 established between the remote and central VPN devices 116, 120. The central VPN device 120 also sends the address information 305 and VPN tunneling information 307 associated with the remote VPN device 116 to the private VPN device 118. For example, the central VPN device 120 establishes a VPN connection 604 with the private VPN device 118 and sends the address and tunneling information 305, 307 to the private VPN device 118 via this VPN connection 604.

Figure 4:
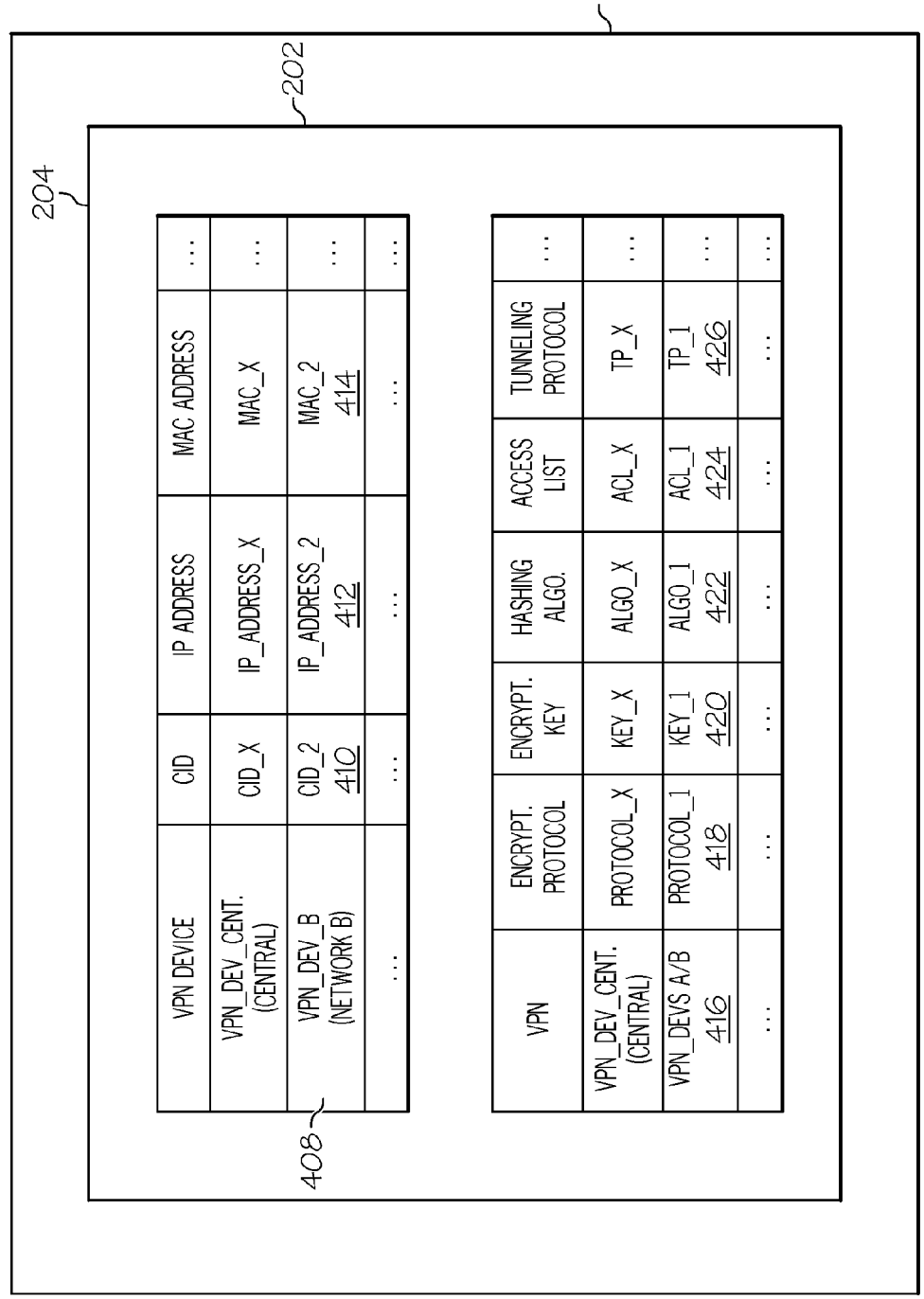
FIG. 4 illustrates one example of the VPN information of FIG. 2 after being updated with a portion of the VPN information of FIG. 3 according to one embodiment of the present invention.

The remote VPN device 116 and the private VPN device 118 store this information in a local storage device. For example, FIG. 4 shows the VPN information 202 of the remote VPN device 116 after it is updated with the VPN information associated with the private VPN device 118. As shown in FIG. 4, the address information 204 of the VPN information 202 now includes an identifier (VPN_Dev_B) 408 associated with the private VPN Device 118, and an optional identifier (Network B) associated with the private network 104. The updated address information 204 also comprises the CID (CID_2) 410, IP address (IP_Address_2) 412, and MAC address (MAC_2) 414 associated with the VPN device 118 of the private network 104. The VPN tunneling information 206 now includes a VPN identifier (VPN_Devs_A/B) 416 identifying the VPN between the remote and private networks 102, 104. This VPN identifier can be the network identifier (Network B) of the private network 104, the VPN device identifier (VPN_Dev_B) or the CID (CID_2) of the private VPN device 118, etc. The updated VPN tunneling information 206 also includes the encryption protocol (Protocol_1) 418, the encryption key (Key_1) 420, hashing algorithm (Algo_1) 422, access list (ACL_1) 424, and tunneling protocol (TP_1) 426 required for establishing a VPN with the private network 104.

Figure 5:
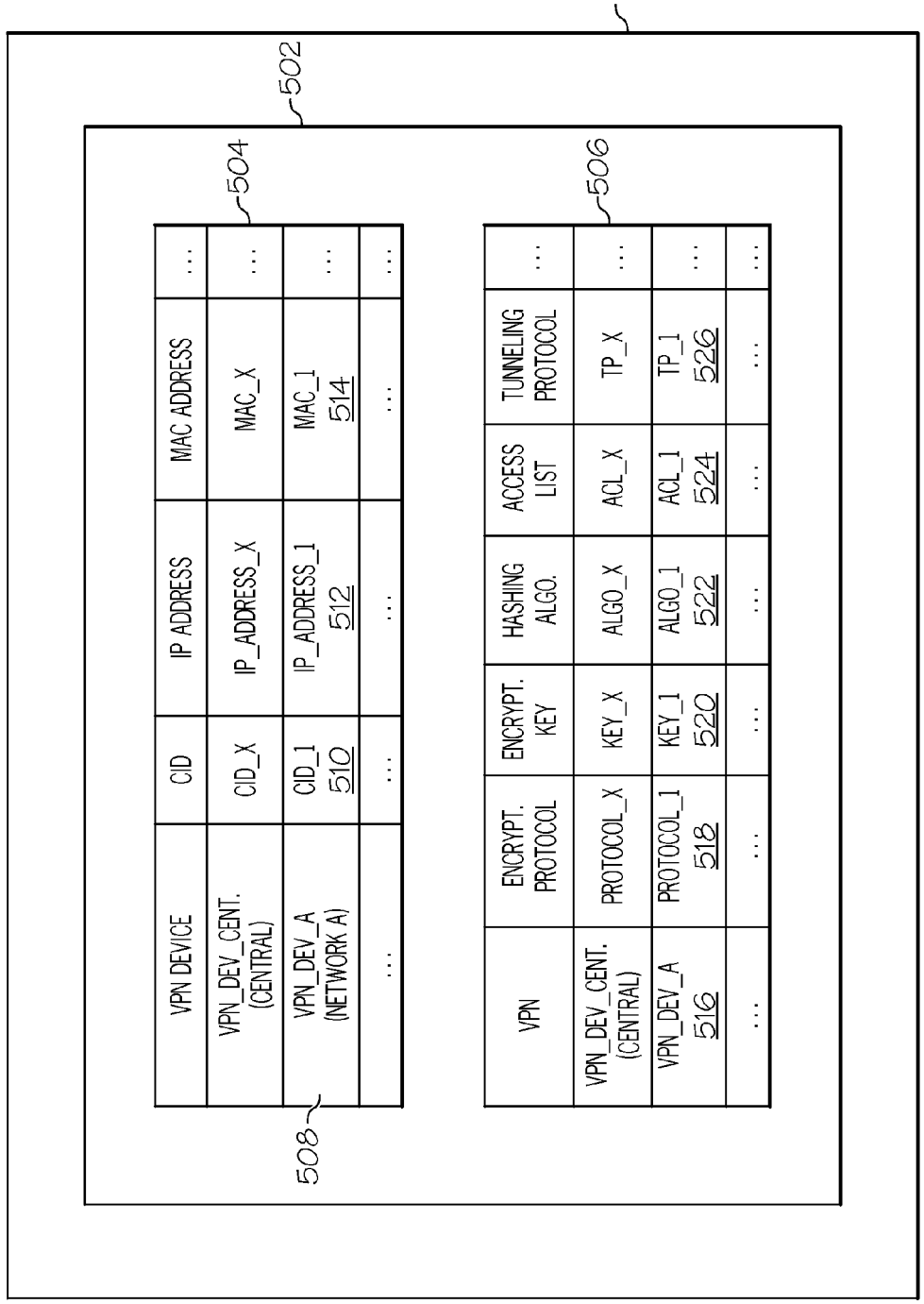
FIG. 5 illustrates one example of the VPN information maintained by a private system in a private network after being updated with a portion of the VPN information of FIG. 3 according to one embodiment of the present invention.

FIG. 5 shows the VPN information 502 of the private VPN device 118 after it is updated with the VPN information associated with the remote VPN device 116. As shown in FIG. 5, the address information 504 of the VPN information 502 now includes an identifier (VPN_Dev_A) 508 associated with the remote VPN Device 116, and an optional identifier (Network A) associated with the remote network 102. The updated address information 504 also comprises the CID (CID_1) 510, IP address (IP_Address_1) 512, and MAC address (MAC_1) 514 associated with the VPN device 116 of the remote network 102. The VPN tunneling information 506 now includes a VPN identifier (VPN_Dev_A) 516 identifying the VPN between the remote and private networks 102, 104. This VPN identifier can be the network identifier (Network A) of the private network 104, the VPN device identifier (VPN_Dev_A) or the CID (CID_1) of the remote VPN device 116, etc. The VPN tunneling information 506 also includes the encryption protocol (Protocol_1) 518, the encryption key (Key_1) 520, hashing algorithm (Algo_1) 522, access list (ACL_1) 524, and tunneling protocol (TP_1) 526 required for establishing a VPN with the remote network 102.

In the above example, a VPN connection 602, 604 currently exists between the remote/central VPN devices 116, 120 and the private/central VPN devices 118, 120. Therefore, the central VPN device has created a VPN between the remote and private VPN devices 116, 118 through which data can be securely sent and received. However, the remote and private VPN devices 116, 118 now maintain VPN information 202, 502 associated with each other. This information allows the remote and private VPN devices 116, 118 to establish VPN connections directly with each other without going through the central VPN device 120.

For example, once the VPN connections 602, 604 are terminated between the remote/central VPN devices 116, 120 and the private/central VPN devices 118, 120 the remote and private VPN devices 116, 118 are able to establish a VPN connection 606 directly between each other using the locally stored VPN information 202, 502. When establishing a direct VPN connection with the private network 104 the remote VPN device 116 uses the address information 204 within the locally stored VPN information 202 to establish a direct path to the private VPN device 118. For example, a request received from a user system 126, 128 in the remote network 102 includes the CID associated with the private VPN device 118. The remote VPN device 116 compares this CID to the locally stored address information 204. The remote VPN device 116 identifies the IP address (and optionally the MAC address) associated with this CID, and uses this address information to establish a direct path to the private VPN device 118.

An Authentication, Authorization, and Accounting (AAA) process is then performed by the private VPN device 118 for identifying and authorizing the remote VPN device 116 to create a secure tunnel between the remote VPN device 116 and the private VPN device 118. As part of the AAA process the private VPN device 118 receives the CID associated with the remote VPN device 116. The private VPN device 118 compares this CID to the access list in the VPN tunneling information 506 of its local VPN information 502 to determine if the remote VPN device is authorized to establish a secure VPN tunnel. In another embodiment, the private VPN device compares the CID to the address information 504 to identify the IP address (and/or MAC address) associated with the remote VPN device 116. The private VPN device 118 then compares the identified IP address and/or MAC address to the access list to determine if the remote VPN device 116 is authorized to establish a secure VPN tunnel.

Once the remote VPN device is authorized, a secure network tunnel (VPN connection) 606 is established directly between the remote VPN device 116 and the private VPN network 118 over the public network 114 using the VPN (tunneling) protocol (e.g., IPsec) identified in the VPN information 202, 502 of the remote and private VPN devices 116, 118. The tunneling protocol enables one network to securely send its data through another network's connections (e.g., the Internet). Tunneling encapsulates a network protocol within packets carried by the second network. For example, an organization's LAN embeds its own network protocol within the TCP/IP packets carried by the Internet.

After the VPN tunnel 606 is established the systems 126, 128, 130, 132 at the remote and private networks 102, 104 can send and receive information securely to/from each other via the VPN devices 116, 118 using the encryption protocol, encryption key, hashing algorithm, etc. identified within the locally stored VPN information 202, 502. For example, the encryption protocol is used to encrypt data packets and the encryption key is used to decrypt the encrypted packet. The hashing algorithm is used to ensure that the information being transmitted over the VPN connection 606 is not altered in any way during transit.

Figure 7:
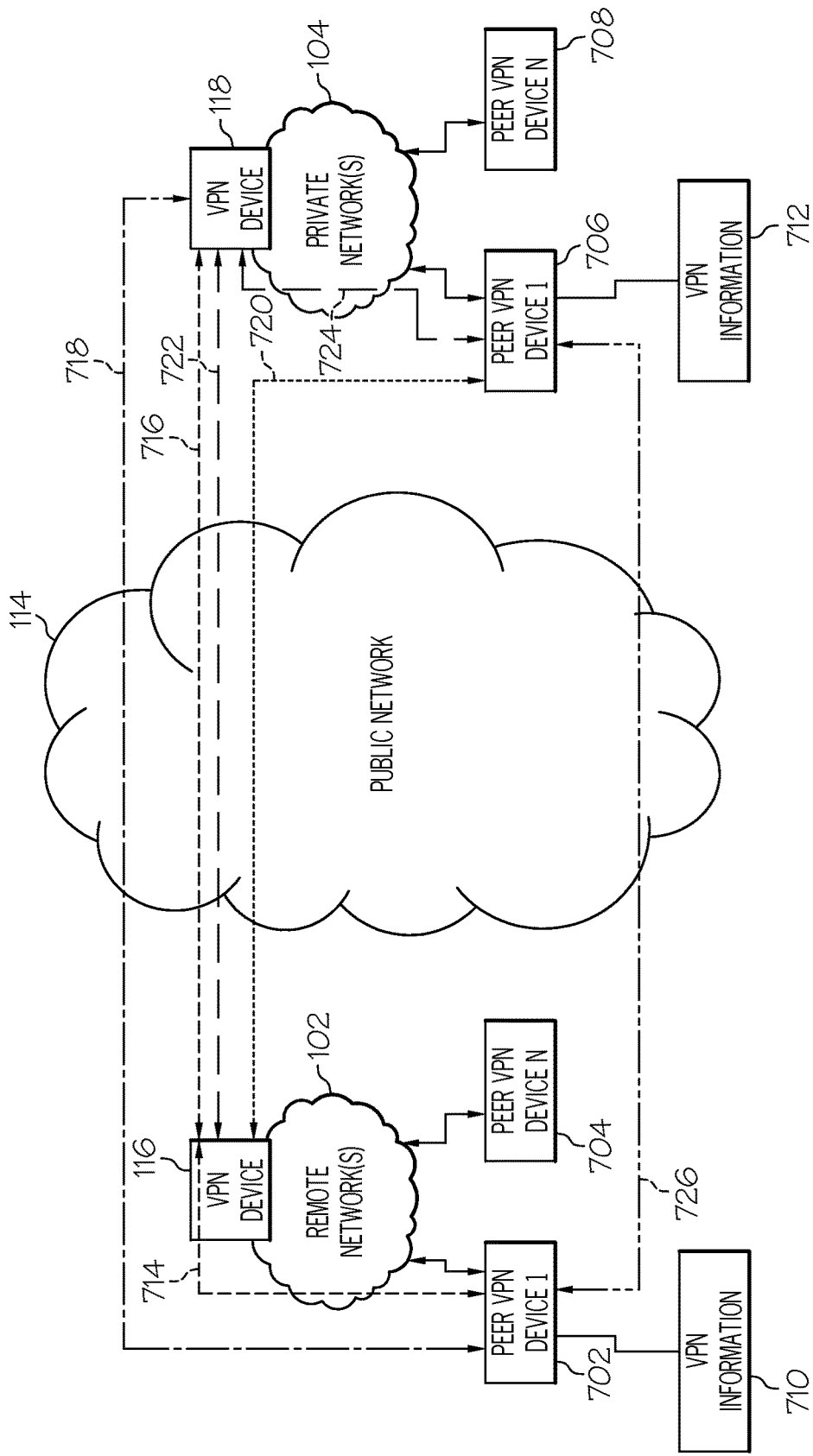
FIG. 7 is a block diagram illustrating various VPN connections established directly between a remote network and a private network according to one embodiment of the present invention.

In addition, once their local VPN information 202, 502 is updated, as discussed above, the remote and private VPN devices 116, 118 act as a central VPN device for any peer VPN devices coupled to the remote and private VPN devices 116, 118 within the same or different networks. For example, FIG. 7 shows a plurality of peer VPN devices 702, 704, 706, 708 coupled to each of the remote and private VPN devices 116, 118. The peer VPN devices 702, 704 of the remote VPN device 116 initially do not include any VPN information associated with the private VPN device 118 and its peer VPN devices 706, 708, and vice versa. Initially, the VPN information 710, 712 of the peer VPN devices 702, 704, 706, 708 is configured with default information including the address and VPN tunneling information associated with the remote VPN device 116 and private VPN device 118, respectively.

A remote peer VPN device 702 establishes a VPN connection 714 with the remote VPN device 116 and requests to be connected to either the private VPN device 118 or one of its peer VPN devices 706, 708. If the remote peer VPN device 702 has requested a VPN connection with the private VPN device 118, the remote VPN device 116 utilizes its VPN information 202 to establish a direct VPN connection 716 with the private VPN device 118 for the remote peer VPN device 702. The remote VPN device 116 sends the VPN address information and tunneling information associated with the private VPN device 118 to the remote peer VPN device 702. The remote peer VPN device 702 updates its VPN information 710 similar to that discussed above with respect to FIGS. 4 and 5. The remote VPN device 116 also sends the VPN address information and tunneling information associated with remote peer VPN device 702 to the private VPN device 118. The private VPN device 118 updates its VPN information 502 accordingly. Once the remote peer VPN device 702 disconnects from the remote VPN device 116 it is able to utilize its updated VPN information 710 to establish a direct VPN connection 718 with the private VPN device 118 without going through the remote VPN device 116. The remote peer VPN device 702 can then act as a central VPN device for any additional peer VPN devices coupled to the remote peer VPN device 702.

If the remote peer VPN device 702 has requested a VPN connection with a private peer VPN device 706, the remote VPN device 116 analyzes its VPN information 202 to determine if VPN information for the private peer VPN device 706 is available. If so, the remote VPN device 116 establishes a VPN connection 720 directly with the private peer VPN device 706. The remote VPN device 116 sends the remote peer VPN device 702 the VPN information associated with the private peer VPN device 706. The remote peer VPN device 702 updates its VPN information 702 accordingly. The remote peer VPN device 116 also sends the private peer VPN device 706 the VPN information associated with the remote peer VPN device 702. The private peer VPN device 704 updates its VPN information 702 accordingly.

If the remote VPN device 116 does not initially have the VPN information associated with the private peer VPN device 702, the remote VPN device 116 establishes a VPN connection 722 with the private VPN device 116 to obtain and store the required VPN information associated with the private peer VPN device 702. This information is then propagated to the remote peer VPN device 116. The remote VPN device 116 also sends the VPN information associated with the remote peer VPN device 702 to the private VPN device 118. The private VPN device 116 stores this VPN information and also sends this information to the private peer VPN device 706 via a VPN connection 724. Once the remote and private peer VPN devices 702, 706 have the required VPN information they establish VPN connections 726 directly with each other without going through the remote and private VPN devices 116, 118. It should be noted that the above discussion also applies to the private VPN device 118 acting as a central device for one or more private peer VPN devices 706, 708.

Operational Flow Diagrams

Figure 8:
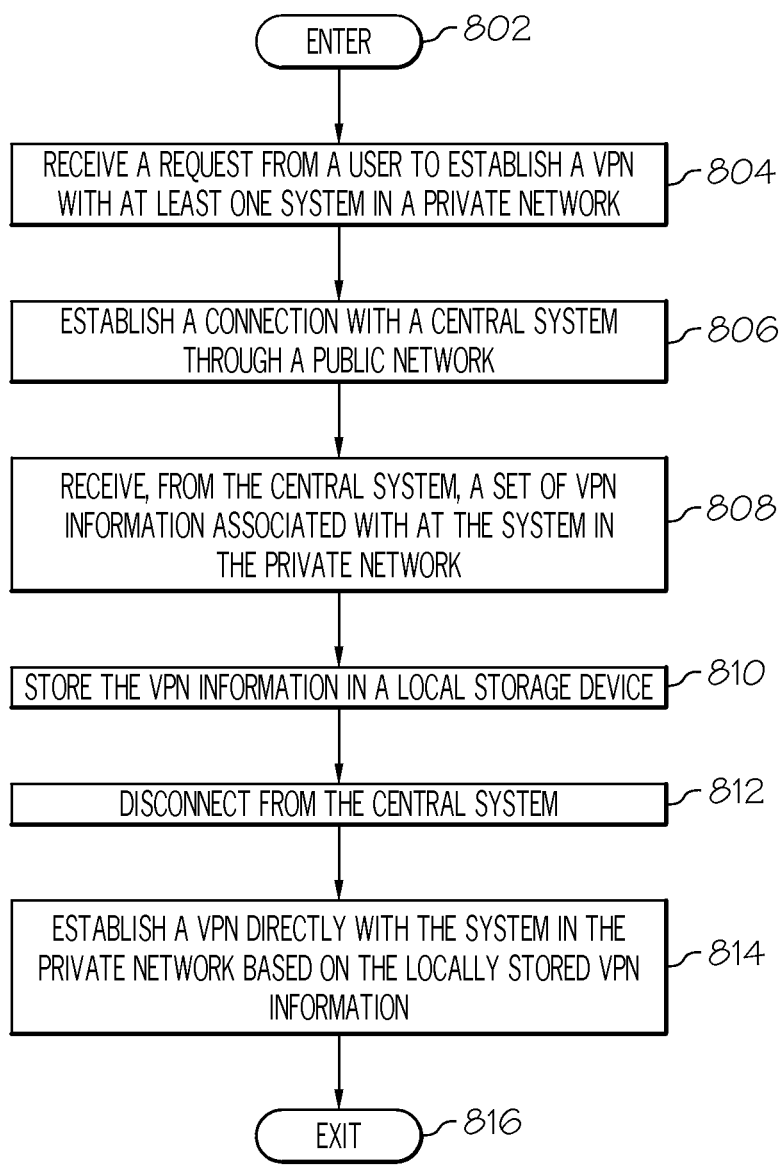
FIG. 8 is an operational flow diagram illustrating one example of establishing a VPN connection directly between a remote network and a private network according to one embodiment of the present invention.

FIG. 8 is an operational flow diagram illustrating one example of establishing a direct VPN between a remote network 102 and a private network 104. The operational flow diagram of FIG. 8 begins at step 802 and flows directly to step 804. A system (remote VPN device) 116 in a remote network 102, at step 804, receives a request from a user to establish a VPN with at least one system (private VPN device) 118 in a private network 104. The system 116, at step 806, establishes a connection with a central system (central VPN device) 120 through a public network 114. The central system 120 is situated between the system 116 and the system 118 in the private network 104. The system 116, at step 808, receives from the central system 120 a set of VPN information associated with the private network system 118. The system 116, at step 810, stores the VPN information in a local storage device. The remote VPN device 116, at step 812, disconnects from the central VPN device 120. The remote VPN device 116, at step 814, establishes a VPN directly with the private network system 104. The control flow then exits at step 816.

Figure 9:
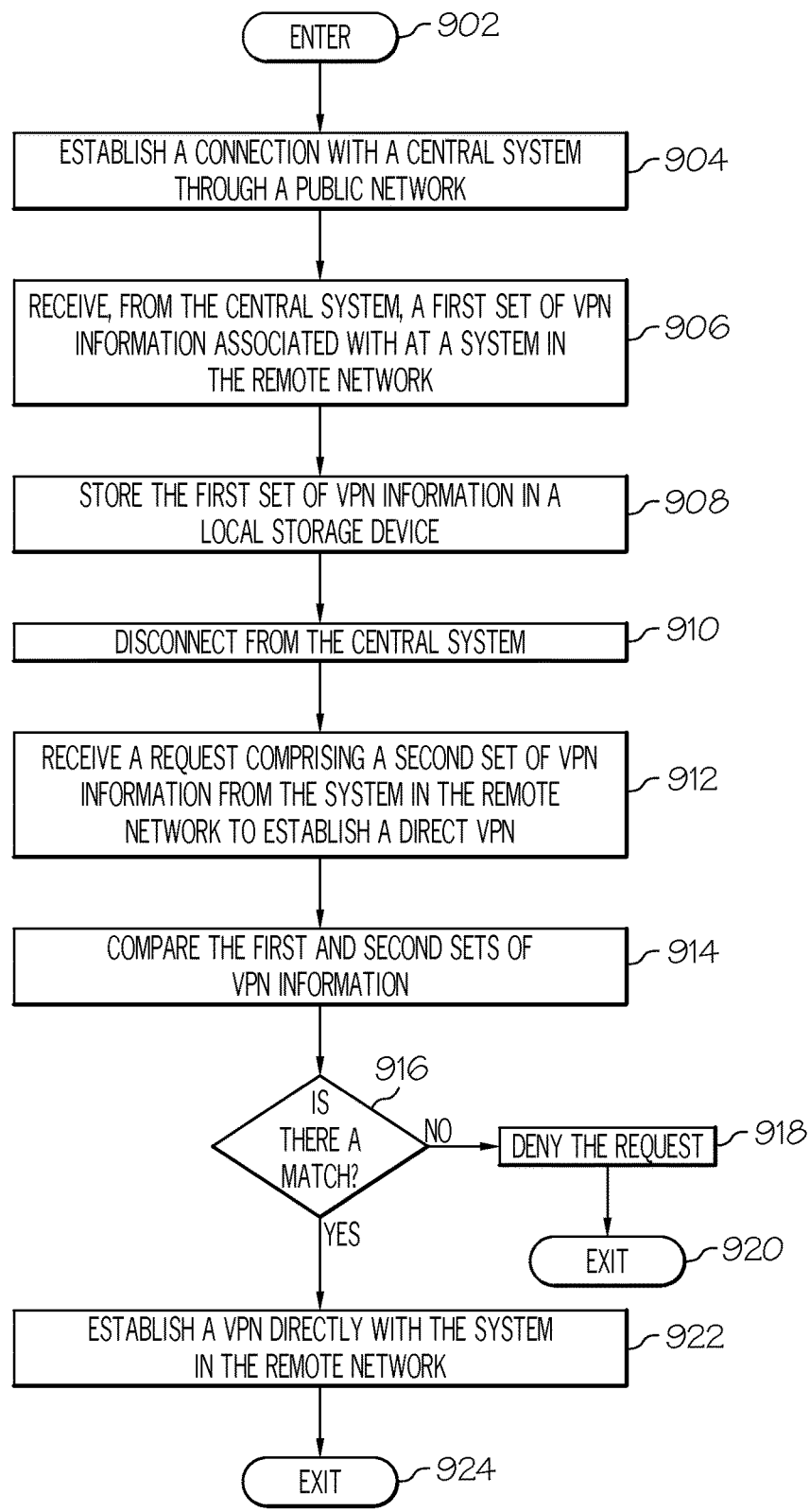
FIG. 9 is an operational flow diagram illustrating another example of establishing a VPN connection directly between a remote network and a private network according to one embodiment of the present invention.

FIG. 9 is an operational flow diagram illustrating another example of establishing a direct VPN between a remote network 102 and a private network 104. The operational flow diagram of FIG. 9 begins at step 902 and flows directly to step 904. A system (private VPN device) 118 in a private network 104, at step 904, establishes a connection with a central system (central VPN device) 120 through a public network 114. The central system 120 is situated between the private network system 118 and a system (remote VPN device) 116 situated in a remote network 102. The private network system 118, at step 906, receives from the central system 120 a first set of VPN information associated with at remote network system 118. The private network system 118, at step 908, stores the first set of VPN information in a local storage device.

The private network system 118, at step 910, disconnects from the central system 120. The private network system 118, at step 912, receives a request directly from the remote network system 116 to establish a direct VPN. This request comprises a second set of VPN information. The private network system 118, at step 914, compares the second set of VPN information with the first set of VPN information. The private network system 118, at step 916, determines if there is a match between the first and second sets of VPN information. If there is no match, the private network system 118, at step 918, denies the request and the control flow exits at step 920. If there is a match, the private network system 118, at step 922, establishes a VPN directly with the remote network system 116. The control flow then exits at step 924.

Figure 10:
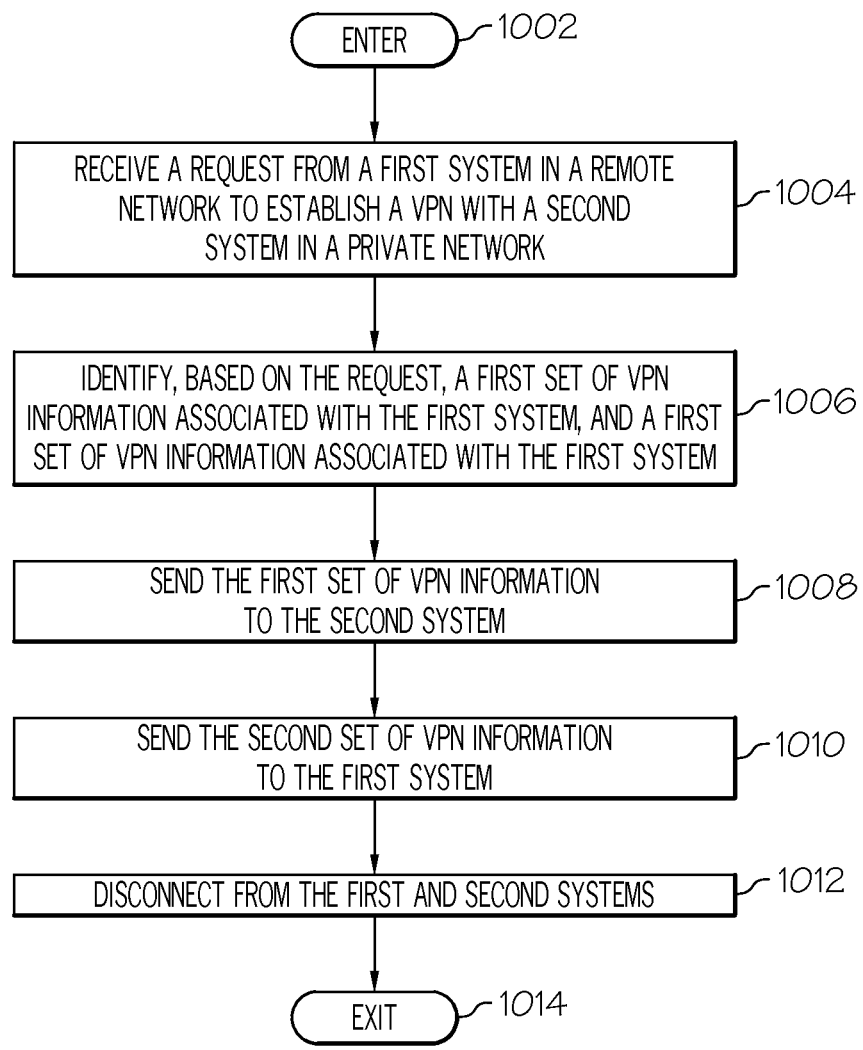
FIG. 10 is an operational flow diagram illustrating a further example of establishing a VPN connection directly between a remote network and a private network according to one embodiment of the present invention.

FIG. 10 is an operational flow diagram illustrating yet another example of establishing a direct VPN between a remote network 102 and a private network 104. The operational flow diagram of FIG. 10 begins at step 1002 and flows directly to step 1004. A central system (central VPN device) 120, at step 1004, receives from a first system (remote VPN device) 116 in a remote network 104 to establish a VPN with the second system (private VPN device) 118 in a private network 104. The central system 120, at step 1006 identifies, based on the request, a first set of VPN information associated with the first system 116, and a second set of VPN information associated with the second system 118. The central system 120, at step 1008, sends the first set of VPN information to the second system 118. The first set of VPN information configures the second system to establish the VPN directly with the first system. The central system 120, at step 1010, sends the second set of VPN information to the first system 116. The second set of VPN information configures the first system to establish the VPN directly with the second system. The central system 120, at step 1012, disconnects from the first and second systems 116, 118. The control flow exits at step 1014.

Information Processing System

Figure 11:
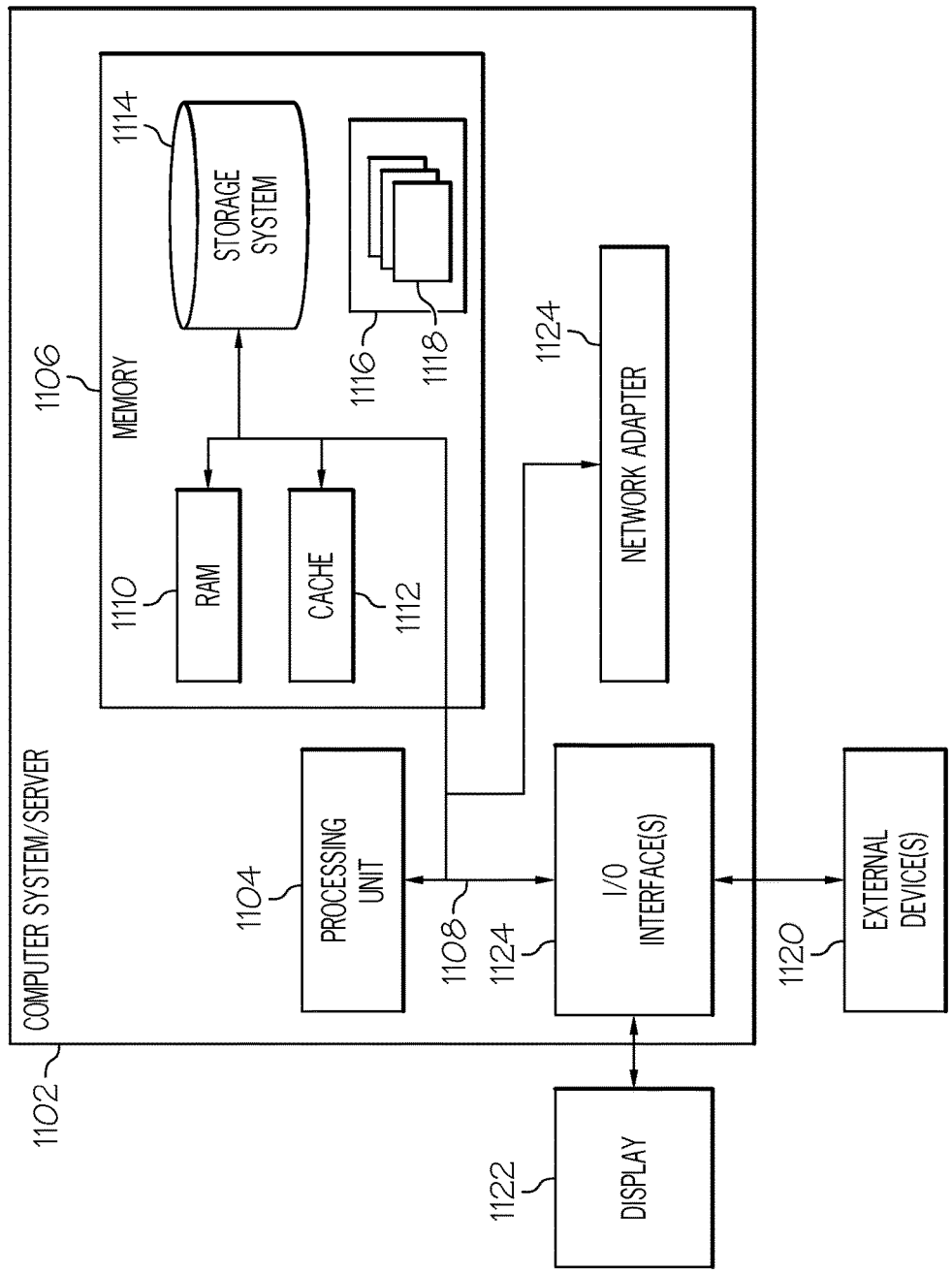
FIG. 11 is a block diagram illustrating one example of an information processing system according to one embodiment of the present invention.

Referring now to FIG. 11, this figure is a block diagram illustrating an information processing system that can be utilized in embodiments of the present invention. The information processing system 1102 is based upon a suitably configured processing system configured to implement one or more embodiments of the present invention such as the VPN devices 116, 118, 112; networking nodes 108, 110, 112; servers 122, 124; and/or user/client systems 126, 128, 130, 132 of FIG. 1. Any suitably configured processing system can be used as the information processing system 1102 in embodiments of the present invention. The components of the information processing system 1102 can include, but are not limited to, one or more processors or processing units 1104, a system memory 1106, and a bus 1108 that couples various system components including the system memory 1106 to the processor 1104.

The bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 11, the main memory 1106 includes the VPN device 116, 118, 120 (if implemented by software) and the VPN information 202, 302, or 502. Also, a VPN device 116, 118, 120 can reside within the processor 1104, or be a separate hardware component as well. The system memory 1106 can also include computer system readable media in the form of volatile memory, such as random access memory (RAM) 1110 and/or cache memory 1112. The information processing system 1102 can further include other removable/non-removable, volatile/non-volatile computer system storage media. By way of example only, a storage system 1114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1108 by one or more data media interfaces. The memory 1106 can include at least one program product having a set of program modules that are configured to carry out the functions of an embodiment of the present invention.

Program/utility 1116, having a set of program modules 1118, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of embodiments of the present invention.

The information processing system 1102 can also communicate with one or more external devices 1120 such as a keyboard, a pointing device, a display 1122, etc.; one or more devices that enable a user to interact with the information processing system 1102; and/or any devices (e.g., network card, modem, etc.) that enable computer system/server 1102 to communicate with one or more other computing devices. Such communication can occur via I/O interfaces 1124. Still yet, the information processing system 1102 can communicate with one or more networks such as a local area network (LAN), a general wide area network (WAN), and/or a public network (e.g., the Internet) via network adapter 1126. As depicted, the network adapter 1126 communicates with the other components of information processing system 1102 via the bus 1108. Other hardware and/or software components can also be used in conjunction with the information processing system 1102. Examples include, but are not limited to: microcode, device drivers, redundant processing units, external disk drive arrays, redundant array of independent disks (RAID) systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An information processing system in a remote network for establishing a site-to-site virtual private network (VPN) between the remote network and a private network, the information processing system comprising:
   a memory;
   a processor communicatively coupled to the memory; and
   a first VPN device communicatively coupled to the memory and the processor, wherein the first VPN device is configured to perform a method comprising:
   receiving a VPN request from a client device within the remote network to establish a VPN connection with the private network;
   analyzing local VPN information for VPN information associated with the private network;
   determining, based on the analyzing, that the local VPN information fails to comprise VPN information associated with the private network;
   establishing a VPN connection with a central system through a public network in response to the local VPN information failing to comprise VPN information associated with the private network, wherein the central system is situated between the first VPN device and a second VPN device in the private network, where the first VPN device is local to the remote network and the second VPN device is local to the private network;
   receiving, from the central system and based on establishing the connection, a set of VPN information associated with at least the second VPN device;
   disconnecting, based on the receiving, from the central system; and
   establishing, based on the set of VPN information, a site-to-site VPN directly with the second VPN device through the public network, wherein one or more client devices within the remote network communicate with the private network utilizing the site-to-site VPN through the first VPN device.

2. The information processing system of claim 1, wherein the set of VPN information comprises at least VPN tunneling information, and wherein the VPN tunneling information comprises at least one of:
   an encryption protocol;
   an encryption key;
   a hashing algorithm;
   an access list; and
   a tunneling protocol.

3. The information processing system of claim 2, wherein the set of VPN information further comprises a set of address information, wherein the set of address information comprises at least one of:
   an identifier associated with the second VPN device;
   an Internet Protocol address associated with the second VPN device; and
   a Media Access Control address associated with the second VPN device.

4. The information processing system of claim 2, wherein establishing the VPN comprises:
   creating a VPN tunnel directly with the second VPN device based on the set of VPN tunneling information.

5. The information processing system of claim 1, wherein the method further comprises:
   storing the set of VPN information in a local memory.

6. The information processing system of claim 1, wherein the method further comprises:
   receiving, from at least one peer system in the remote network, a request to establish a VPN with at least one system in the private network; and
   sending, a set of VPN information associated with the at least one system in the private network to at least one peer system, wherein the set of VPN information configures at least one peer system to establish a VPN directly with the at least one system in the private network through the public network.

7. The information processing system of claim 6, wherein the set of VPN information associated with at least one system in the private network is obtained from the second VPN device in the private network.

8. A computer program storage product for establishing a site-to-site virtual private network (VPN) between a first VPN device in a remote network and a second VPN device in a private network, the computer program storage product comprising instructions configured to perform a method comprising:
   receiving a VPN request from a client device within the remote network to establish a VPN connection with the private network;
   analyzing local VPN information for VPN information associated with the private network;
   determining, based on the analyzing, that the local VPN information fails to comprise VPN information associated with the private network;
   establishing a VPN connection with a central system through a public network in response to the local VPN information failing to comprise VPN information associated with the private network, wherein the central system is situated between the first VPN device and a second VPN device in the private network, where the first VPN device is local to the remote network and the second VPN device is local to the remote network;
   receiving, from the central system and based on establishing the connection, a set of VPN information associated with at least the second VPN device;
   disconnecting, based on the receiving, from the central system; and
   establishing, based on the set of VPN information, a site-to-site VPN directly with the second VPN device through the public network, wherein one or more client devices within the remote network communicate with the private network utilizing the site-to-site VPN through the first VPN device.

9. The computer program storage product of claim 8, wherein the set of VPN information comprises at least VPN tunneling information, and wherein the VPN tunneling information comprises at least one of:
   an encryption protocol;
   an encryption key;
   a hashing algorithm;
   an access list; and
   a tunneling protocol.

10. The computer program storage product of claim 9, wherein the set of VPN information further comprises a set of address information, wherein the set of address information comprises at least one of:
    an identifier associated with the second VPN device;
    an Internet Protocol address associated with the second VPN device; and
    a Media Access Control address associated with the second VPN device.

11. The computer program storage product of claim 9, wherein establishing the VPN comprises:
    creating a VPN tunnel directly with the second VPN device based on the set of VPN tunneling information.

12. The computer program storage product of claim 8, wherein the method further comprises:
    storing the set of VPN information in a local memory.

13. The computer program storage product of claim 8, wherein the method further comprises:
    receiving, from at least one peer system in the remote network, a request to establish a VPN with at least one system in the private network; and
    sending, a set of VPN information associated with the at least one system in the private network to at least one peer system, wherein the set of VPN information configures at least one peer system to establish a VPN directly with the at least one system in the private network through the public network.

14. The computer program storage product of claim 13, wherein the set of VPN information associated with at least one system in the private network is obtained from the second VPN device in the private network.

15. An information processing system in a private network for establishing a site-to-site virtual private network (VPN) between the private network and a remote network, the information processing system comprising:
    a memory;
    a processor communicatively coupled to the memory; and
    a first VPN device communicatively coupled to the memory and the processor, wherein the first VPN device is configured to perform a method comprising:
       receiving a VPN request from a client device within the remote network to establish a VPN connection with the private network;
       analyzing local VPN information for VPN information associated with the private network;
       determining, based on the analyzing, that the local VPN information fails to comprise VPN information associated with the private network;
       establishing VPN a connection with a central system through a public network in response to the local VPN information failing to comprise VPN information associated with the private network, wherein the central system is situated between the first VPN device and a second VPN device in the remote network, where the first VPN device is local to the remote network and the second VPN device is local to the remote network;
       receiving, from the central system and based on establishing the connection, a first set of VPN information associated with at least the second VPN device;
       disconnecting, based on the receiving, from the central system;
       receiving a request directly from the second VPN device to establish a direct VPN, wherein the request comprises a second set of VPN information;
       comparing the second set of VPN information with the first set of VPN information; and
       establishing, based on the first and second sets set of VPN information matching, a site-to-site VPN directly with the second VPN device through the public network, wherein one or more client devices within the remote network communicate with the private network utilizing the site-to-site VPN through the first VPN device, and wherein one or more client devices within the private network communicate with the remote network utilizing the site-to-site VPN through the second VPN device.

16. The information processing system of claim 15, wherein the first and second sets of VPN information comprise at least VPN tunneling information, and wherein the VPN tunneling information comprise at least one of:
    an encryption protocol;
    an encryption key;
    a hashing algorithm;
    an access list; and
    a tunneling protocol.

17. The information processing system of claim 15, wherein each of the first and second sets of VPN information further comprises address information, wherein the address information comprises at least one of:
    an identifier associated with the second VPN device;
    an Internet Protocol address associated with the second VPN device; and
    a Media Access Control address associated with the second VPN device.

18. The information processing system of claim 17, wherein establishing the VPN comprises:
    creating a VPN tunnel directly with the second VPN device based on at least the first and second sets of VPN tunneling information.

19. The information processing system of claim 15, wherein the method further comprises:
    storing the first set of VPN information in a local memory.

20. The information processing system of claim 15, wherein the method further comprises:
    receiving, from at least one peer system in the private network, a request to establish a VPN with at least one system in the remote network; and
    sending, a set of VPN information associated with at least one system in the remote network to at least one peer system, wherein the set of VPN information configures at least one peer system to establish a VPN directly with at least one system in the remote network through the public network.

21. The information processing system of claim 20, wherein the set of VPN information associated with at least one system in the remote network is obtained from the second system in the remote network.

* * * * *